J. PEIFFER & S. RICHARDS,
Ass'ors, by mesne assignments, to said J. PEIFFER, C. H. PEIFFER & H. C. JOHNSON.
Apparatus for Aging Whisky and other Spirits.
No. 8,042. Reissued Jan. 15, 1878.
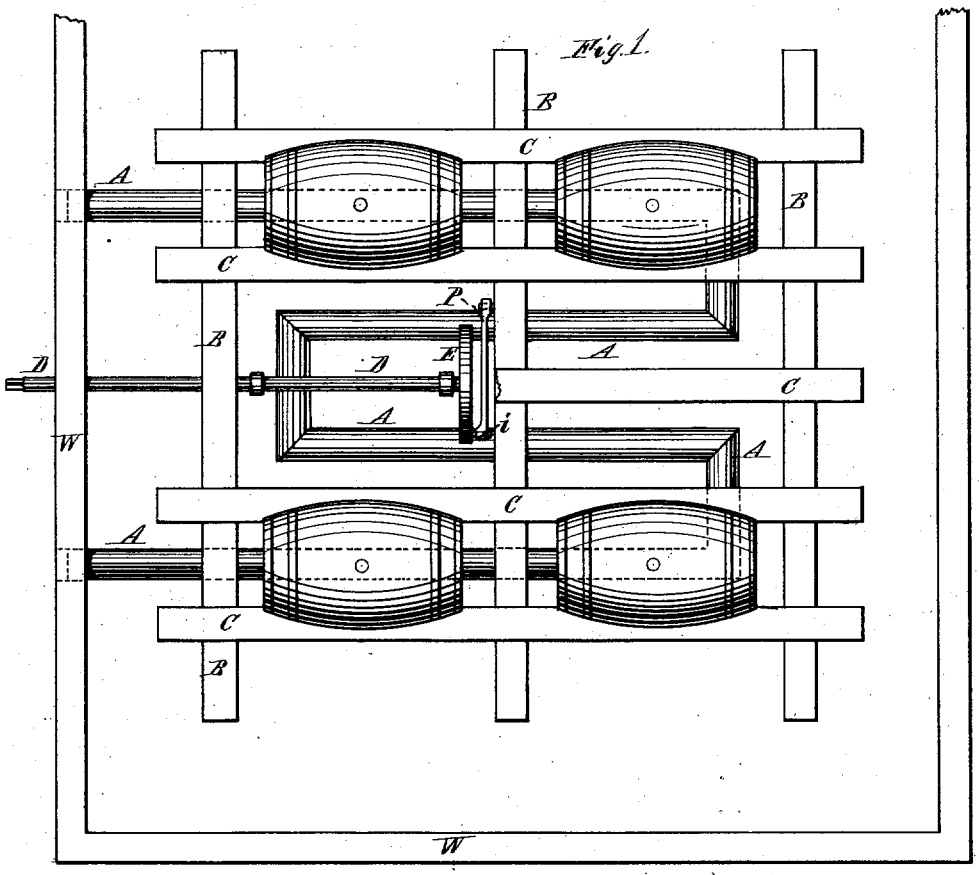
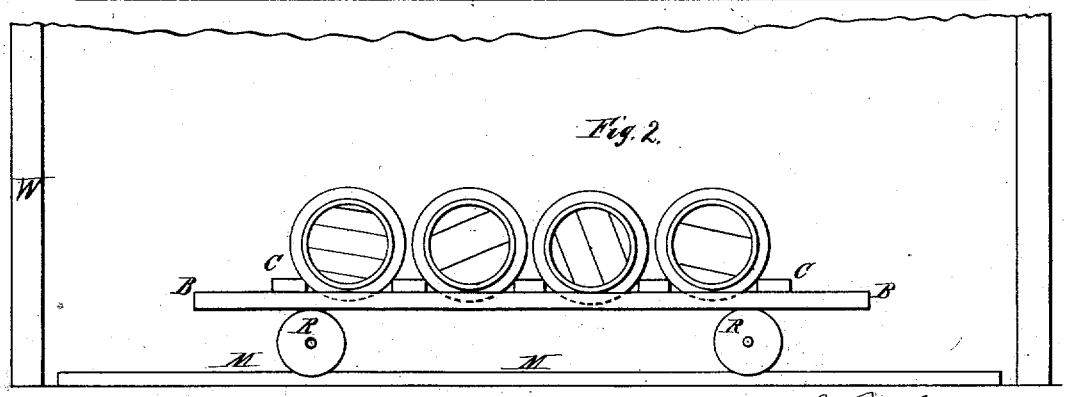
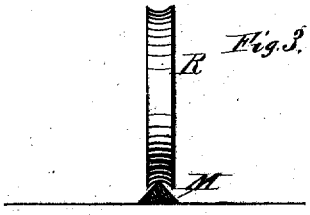
WITNESSES:
Chas. C. Searle,
D. P. Cowe
J. Peiffer and
S. Richards,
INVENTORS:
BY Worth Osgood,
ATTORNEY.
N. PETERS, PHOTO-LITHOGRAPHER, WASHINGTON, D. C.

UNITED STATES PATENT OFFICE.

JOSIAH PEIFFER AND SAMUEL RICHARDS, OF VALONIA, PENNSYLVANIA, ASSIGNORS, BY MESNE ASSIGNMENTS, TO SAID JOSIAH PEIFFER, CORDELIA H. PEIFFER, AND HENRY C. JOHNSON.

IMPROVEMENT IN APPARATUS FOR AGING WHISKY AND OTHER SPIRITS.

Specification forming part of Letters Patent No. 112,485, dated March 7, 1871; Reissue No. 8,042, dated January 15, 1878; application filed December 4, 1877.

*To all whom it may concern:*

Be it known that we, JOSIAH PEIFFER and SAMUEL RICHARDS, of Valonia, in the county of Crawford and State of Pennsylvania, have jointly invented certain new and useful Improvements in Apparatus for Aging Whisky and other Spirits, of which the following is a full, clear, and exact description, reference being had to the accompanying drawing, and to the letters of reference marked thereon.

Figure 1 is a plan, and Fig. 2 an end view, of the apparatus chosen to illustrate the principles of our invention. Fig. 3 is an elevation of the grooved wheel and section of the rail which is designed to be used in connection with the movable platform.

Like letters of reference in all the figures indicate corresponding parts.

Our invention has relation to that class of devices commonly employed in the process known as aging whisky and other liquors; and it consists, chiefly, in an improved means of heating the room which contains the liquor and the agitating apparatus, and in certain peculiarities of construction and arrangements of the parts of the agitator, as will be hereinafter first fully described, and then pointed out in the claims.

When whisky is new it is impregnated with an essential oil, ordinarily denominated "fusel oil." It is the presence of this substance in the liquor which gives it the taste peculiar to new whisky. In time, the fusel-oil passes off or undergoes some chemical change, and the liquor is thereby much improved.

Experience has demonstrated that the evaporation of this oil may be very much hastened if the liquor is agitated; and, further, that the agitation in the presence of heat is much more advantageous for the accomplishment of the desired aging than if the heat be omitted. It is found that the fusel-oil will vaporize at about 110° Fahrenheit. To apply this or a suitable degree of heat in desirable proximity to the casks which contain the liquor, and in such manner that the same may be conveniently regulated in order to better answer the purposes of the invention, we employ suitable pipes or conduits A A for conveying steam. These pipes are, of course, placed in some suitable room or house adapted to accommodate the agitators, and are so located as not to interfere with the motion or disposition of the casks upon their racks.

This means of heating the aging-room is preferable to any other mode, for the reasons that the degree of heat may be more uniformly regulated, and that the condition of the surrounding atmosphere is, by use of the steam, more favorable for the desired evaporation; further, by use of conduits for the heat, it may be conveyed from a point exterior to the aging-room, and thus the doors permitted to remain locked, as is required by the regulations governing the storage of liquor "in bond."

This method of heating the liquor, together with the use of the agitators, enables us to imitate very closely all the conditions and motions of liquors upon ship-board, which liquors are well known to be improved by a voyage at sea.

Instead of giving the casks a pendulous motion, as has heretofore been proposed, we prefer to place them upon a rack which has a reciprocating motion in a practically horizontal plane, since this will enable us to more effectually agitate the contents.

M M is one of a pair of tracks upon which the grooved wheels R R are caused to move back and forth, carrying with them the framework B C, upon which are mounted any number of liquor casks, 1, 2, 3, &c.

The desired reciprocating motion is communicated to the cask-carriage by means of a pitman, P, coupled at one end to one of the carriage-timbers B, and at the other to the crank-wheel E, as at *i*.

The shaft D of the crank-wheel extends beyond the frame and through the wall W of the room, and may be moved by a steam-engine, by water-power, or by other power, thus communicating motion to the movable parts of the apparatus.

The driving-shaft and the steam-pipes being so located as that the power may be applied to the one and the heater connected with the other from points outside of the aging-room, and since the apparatus is extremely simple and not liable to get out of order, the process of aging may be carried on for the required length of time without the necessity of unlocking the room or warehouse. Moreover, by use of the principles of our invention the liquor is effectually agitated under very favorable conditions, tending toward its aging or ripening, which process, it is found, may be completed in a few weeks.

Having thus fully described our invention, what we claim as new, and desire to secure by Letters Patent, is—

1. In combination with apparatus for moving the vessels containing the liquor, a pipe or conduit for conveying steam in suitable proximity thereto, substantially as and for the purposes set forth.

2. In an apparatus for aging liquors, a frame or rack for supporting the vessels containing the liquor, and having a reciprocating-motion upon rollers, in combination with steam-pipes or conduits, the rack traversing the steam-pipes, substantially as set forth.

3. In an apparatus for aging liquors, a frame, B C, mounted upon rollers R R, which move upon a suitable track, the whole combined with a crank and pitman for communicating the desired motion, substantially as shown and described.

4. In an apparatus for aging liquors, the combination of a cask or barrel-supporting frame mounted upon rollers, which move upon a practically horizontal track, a crank and pitman for communicating the desired motion, and the steam-conducting pipes or conduits, the whole arranged and operating substantially as and for the purposes set forth.

In testimony that we claim the foregoing we have hereunto set our hands in the presence of three witnesses.

JOSIAH PEIFFER.
SAMUEL RICHARDS.

Witnesses:
CHAS. W. STUART,
THOMAS A. MCFARLAND,
DANIEL LYONS.